United States Patent
Heo et al.

(10) Patent No.: US 12,073,185 B2
(45) Date of Patent: Aug. 27, 2024

(54) METHOD AND DEVICE OF SEGMENTING TOPICS OF CONTENT

(71) Applicant: AJOU UNIVERSITY INDUSTRY—ACADEMIC COOPERATION FOUNDATION, Suwon-si (KR)

(72) Inventors: Jaejong Heo, Suwon-si (KR); Kyungwon Lee, Seoul (KR); Hyoji Ha, Seoul (KR)

(*) Notice: Subject to any disclaimer, the term of this patent is extended or adjusted under 35 U.S.C. 154(b) by 225 days.

(21) Appl. No.: 17/978,421

(22) Filed: Nov. 1, 2022

(65) Prior Publication Data
US 2023/0067435 A1 Mar. 2, 2023

(30) Foreign Application Priority Data
Sep. 2, 2021 (KR) .................. 10-2021-0116943

(51) Int. Cl.
*G06F 40/30* (2020.01)
*G06F 40/268* (2020.01)
*G06F 40/279* (2020.01)
*G06F 40/166* (2020.01)

(52) U.S. Cl.
CPC ............ *G06F 40/30* (2020.01); *G06F 40/166* (2020.01); *G06F 40/268* (2020.01); *G06F 40/279* (2020.01)

(58) Field of Classification Search
CPC .... G06F 40/166; G06F 40/268; G06F 40/279; G06F 40/30
See application file for complete search history.

(56) References Cited

U.S. PATENT DOCUMENTS

| | | | | |
|---|---|---|---|---|
| 2003/0187642 | A1* | 10/2003 | Ponceleon | G10L 15/1822 704/252 |
| 2005/0216443 | A1* | 9/2005 | Morton | G06F 16/435 |
| 2006/0265209 | A1* | 11/2006 | Bradford | G06F 40/42 704/9 |
| 2008/0306899 | A1* | 12/2008 | Gregory | G06F 16/345 |

(Continued)

OTHER PUBLICATIONS

Ho, J., Ha, H., Seok-Won, L., & Lee, K., "Using conceptual recurrence and consistency metrics for topic segmentation in debate.", 2022, Applied Sciences, 12(6), 2952. doi:http://dx.doi.org/10.3390/app12062952 (Year: 2022).*

(Continued)

*Primary Examiner* — Eric Yen
(74) *Attorney, Agent, or Firm* — ANTONIO HA & U.S. PATENT, LLC

(57) ABSTRACT

A method of segmenting topics of content according to an embodiment is configured to preprocess text data configured of content, and divide a plurality of utterances into two topic segmented bodies based on the preprocessed data. The preprocessing may be performed by processing the text data in a continuous form of the plurality of utterances, and calculating a conceptual similarity between utterances based on the processed data. The topic segmented bodies may be divided into two by calculating similarity cohesion for the two topic segmented bodies based on the conceptual similarity and a consistency metric while changing a segmentation point which distinguishes the two topic segmented bodies, and determining the segmentation point based on the similarity cohesion.

20 Claims, 14 Drawing Sheets

(56) References Cited

U.S. PATENT DOCUMENTS

| | | | |
|---|---|---|---|
| 2009/0067719 A1* | 3/2009 | Sridhar | G06F 40/289 |
| | | | 382/176 |
| 2013/0158986 A1* | 6/2013 | Wiles | G06F 40/35 |
| | | | 704/9 |
| 2014/0214402 A1* | 7/2014 | Diao | G06F 40/258 |
| | | | 704/9 |
| 2015/0179168 A1* | 6/2015 | Hakkani-Tur | G10L 15/22 |
| | | | 704/257 |
| 2017/0220997 A1* | 8/2017 | Shima | H04L 65/403 |
| 2020/0105274 A1* | 4/2020 | Joller | G06F 16/635 |
| 2021/0027783 A1* | 1/2021 | Szymanski | G06N 3/08 |
| 2021/0390127 A1* | 12/2021 | Fox | G06F 40/289 |

OTHER PUBLICATIONS

Jaejong Ho, "topic Segmentation in Debate based on Conceptual Recurrence & Debate's Consistency metrics", Ajou Univ. Aug. 2021.

English Abstract of "Jaejong Ho,"topic Segmentation in Debate based on Conceptual Recurrence & Debate's Consistency metrics", Ajou Univ. Aug. 2021".

* cited by examiner (a)           (b)

(a)  Point of high  (b)
     self-continuity (a)     (b)

METHOD AND DEVICE OF SEGMENTING TOPICS OF CONTENT

CROSS-REFERENCE TO RELATED APPLICATION

This application claims priority to Korean Patent Application No. 10-2021-0116943 filed in the Korean Intellectual Property Office on Sep. 2, 2021, the disclosure of which is incorporated by reference herein in its entirety.

BACKGROUND OF THE DISCLOSURE

Field of the Disclosure

This specification relates to a method and device of segmenting topics of content, and more particularly, to a method of segmenting topics of a debate based on conceptual recurrence and consistency metrics.

Related Art

A debate is an act of dialogue in which panelists with different opinions try to persuade opponents to solve a posed issue. In particular, TV debates and radio debates play a major role as public forums in influencing public opinion as they deal with social issues such as political campaigns and elections. These TV or radio debates are converted into video or audio content and provided through the relevant website of the broadcasting station or YouTube.

In addition, recently, a podcast, a type of Internet broadcasting, is popular as a service that delivers current affairs or the stories of experts related to a specific topic in the form of audio files or video files. Users may select and subscribe to a desired program.

When these broadcasting debates or podcast programs are delivered to viewers or subscribers over the Internet, for the convenience of viewing or to solve the issue of large upload or streaming file sizes, the relevant content may be cut into smaller sizes in accordance with progress content or the content is given the same index as a chapter, thereby making it easy for viewers to skip to a desired portion.

However, in order to cut or index content, an operator has to figure out the content one by one and divide a chapter by small topics, which is a tedious and cumbersome task. In addition, for long content, this task may take a lot of time, which may result in delays in streaming or uploading.

SUMMARY OF THE DISCLOSURE

This specification is directed to addressing an issue associated with the related art, and to providing a method of automatically segmenting content such as a debate into smaller units according to topics.

A method of segmenting topics of content according to an embodiment of this specification includes: preprocessing text data configuring content; and dividing a plurality of utterances into two topic segmented bodies based on the preprocessed data, wherein the preprocessing includes: processing the text data in a continuous form of the plurality of utterances; and calculating a conceptual similarity between utterances based on the processed data, and wherein the dividing includes: calculating similarity cohesion for the two topic segmented bodies based on the conceptual similarity while changing a segmentation point which distinguishes the two topic segmented bodies and a consistency metric; and deciding the segmentation point based on the similarity cohesion.

A device of segmenting topics of content according to another embodiment of this specification includes: an input unit for receiving text data configuring content; a processor for preprocessing the text data and dividing a plurality of utterances into two topic segmented bodies based on the preprocessed data; and a visualization unit for visualizing and expressing the divided topic segmented bodies, wherein the processor is configured to: process the text data in a continuous form of the plurality of utterances and calculate a conceptual similarity between the utterances based on the processed data; calculate similarity cohesion for the two topic segmented bodies based on the conceptual similarity and a consistency metric while changing a segmentation point which distinguishes the two topic segmented bodies, and determine the segmentation point based on the similarity cohesion.

Accordingly, it is possible to automatically segment topics for debate content including multiple topics. In addition, an operator may intervene in topic segmentation to some extent to obtain a user-centered topic segmentation result.

In addition, it is possible to alleviate the issue of determining a topic segmentation point differently for each operator.

In addition, long debate content may be quickly segmented into topics in line with operator needs, thereby avoiding delays in uploading or streaming content.

In addition, it is possible to automatically write the minutes of a meeting worked by a plurality of participants in small units according to a change in the topic of the meeting during the progress of the meeting.

DESCRIPTION OF EXEMPLARY EMBODIMENTS

Figure 1:
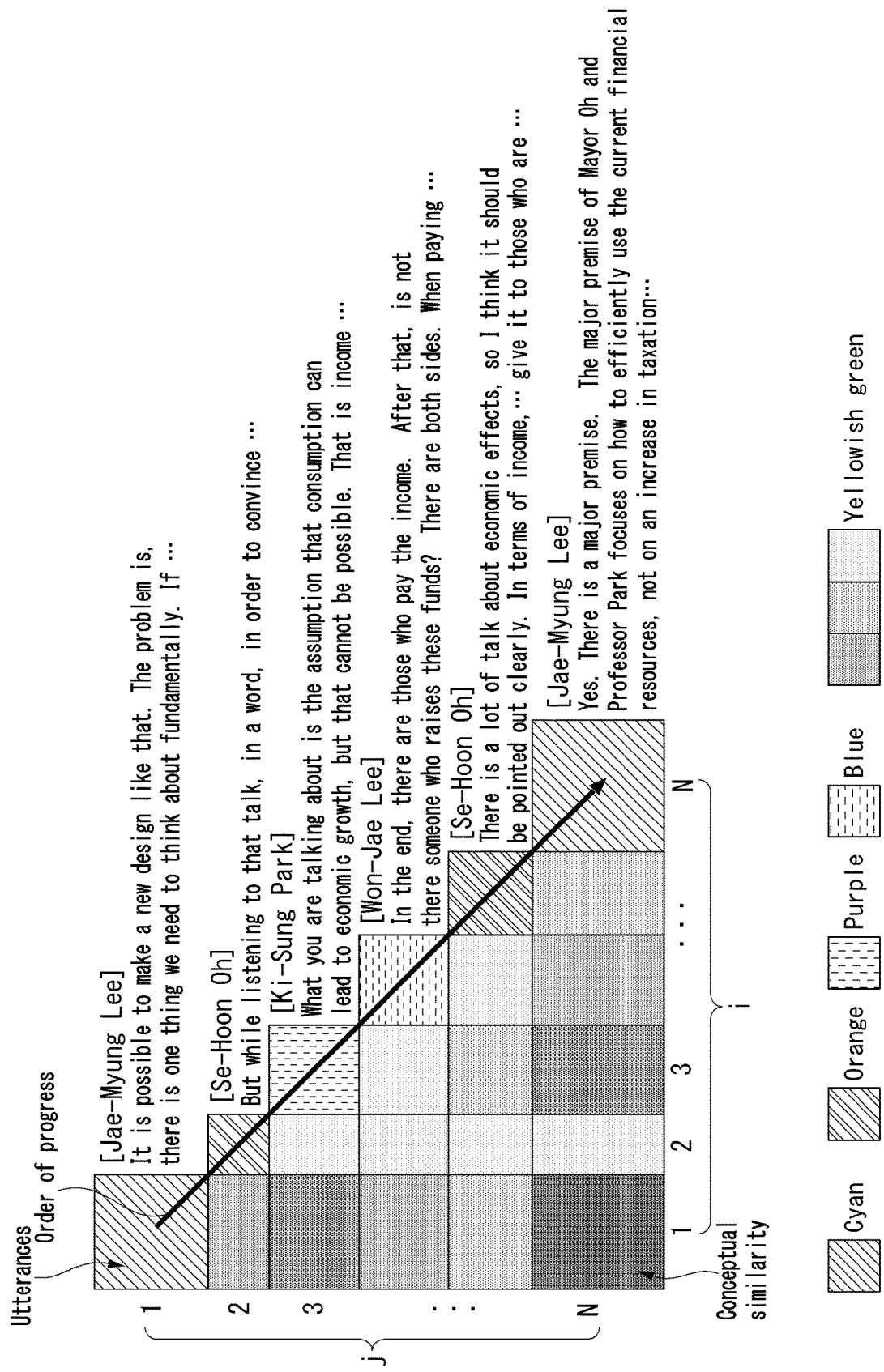
FIG. 1 is a visualization of conceptual recurrence in a debate.

Hereinafter, preferred embodiments of a method of segmenting topics of content and a method of driving a device according to an embodiment of this specification will be described in detail with reference to the accompanying drawings.

Like reference numerals substantially refer to like elements throughout the specification. In the following description, when it is determined that a detailed description of known functions or configuration related to an embodiment of this specification unnecessarily obscures the gist of this specification, the detailed description thereof will be omitted.

In the research case of segmenting topics thus far, which automatically segments texts into smaller sub-topics, it was not easy to segment topics in a multilateral dialogue. This is because, in the multilateral dialogue, even the same persons may determine a topic differently. A debate is also a multilateral dialogue.

Among the various research cases to analyze a debate, there were visual analysis studies, and in the visual analysis of the debate, there were attempts to search for the topics included in the debate. Visual analysis is a technology that blends interactive visualization and automated analysis techniques to integrate human determination and algorithmic data analysis processes.

The inventors of an embodiment included in this specification have discovered the possibility of segmenting the script of a debate into smaller sub-topics in a conceptual recurrence method of analyzing a multilateral dialogue. Herein, the conceptual recurrence method calculates the similarity between utterances as a quantitative value called a conceptual similarity.

Social science research on debate may analyze internal consistency, which is the consistency that appears as a result of the interaction of debaters. The attributes that affect this semantic consistency may include other-continuity, self-continuity, a chain of arguments and counterarguments, and a topic guide of a moderator.

In social science analysis, the semantic consistency means the consistency of the central topic between consecutive statements by the interaction of debaters, and indicates a conceptual similarity in a conceptual recurrence method according to visual analysis or similarity between utterances that appear through the interaction between utterances. In other words, both correspond to the attributes indicating the interaction of the debaters.

Accordingly, this specification proposes a user-centered topic segmentation model from the perspective of visual analysis that analyzes data through user interaction, and proposes an approach in which a user adjusts the attributes indicating the interaction of debaters in a visualization environment of conceptual recurrence to segment topics and explore the topics.

This specification proposes a model for segmenting topics from a debate using i) the relationship between topic segmentation and conceptual similarity, and ii) the relationship between topic segmentation and consistency metric of a debate.

In other words, regarding the relationship between topic segmentation and conceptual similarity, the following attributes may be used that a topic is formed in a portion where the conceptual similarity is relatively high, and a topic segmentation point corresponds to the main utterance leading to a debate topic.

In addition, regarding the relationship between topic segmentation and consistency metric of a debate, the attributes that affect the internal consistency of the debate affect the conceptual similarity and affect the topic segmentation. Considering that attributes that increase the internal consistency of the debate have a positive effect on the relevant conceptual similarity, and that attributes that impair the internal consistency of the debate have a negative effect on the relevant conceptual similarity, attributes that affect internal consistency may be quantified as metrics and used for calculating conceptual similarity and segmenting topics.

Accordingly, the topic segmentation may be corrected by automatically segmenting the script of a debate into sub-topics through a conceptual recurrence-based topic segmentation model, and adjusting a weighting of the metric indicating the consistency of the debate. In addition, through the interactive function provided by a visual analysis tool, it is possible to obtain the result of searching the topic section centered on a user (or an operator) and segmenting topics.

First, conceptual recurrence is described in relation to the visual analysis of a debate.

Angus, Smith, and Wile proposed a conceptual recurrence method indicating the similarity between utterances as conceptual similarity (Angus, D.; Smith, A.; Wiles, J. Conceptual recurrence plots: Revealing patterns in human discourse. IEEE transactions on Visualization and Computer Graphics 2011, 18, 988-997). Based thereon, various discourses occurring in broadcast interviews and hospitals have been analyzed as conceptual recurrence. In this specification, a debate is also included in a discourse, so a conceptual recurrence method is used for debate analysis.

Conceptual recurrence constructs visualizations based on a conceptual similarity. The conceptual similarity is a value obtained by calculating the similarity between each utterance. In conceptual recurrence visualization, there is a visual pattern (engagement block) that may be understood by grouping utterances through conceptual similarities between utterances, and thus, similar utterances may be grouped and analyzed.

FIG. 1 is a visualization of conceptual recurrence in a debate.

In FIG. 1, i denotes the horizontal axis number and j denotes the vertical axis number. Based on the vertical axis, there are 6 squares in the first column, 5 squares in the second column, and similarly developed, one square in the sixth column.

In FIG. 1, blocks (or squares) at the top of each column, namely, cyan, orange, purple, and blue squares, represent utterances, and the larger the utterance amount, the larger the squares indicating the relevant utterances. The utterance proceeds diagonally from the upper left to the lower right.

Except for the square at the top of each column, the squares below, namely, yellowish green squares, represent a conceptual similarity, meaning the similarity between the utterances above and the utterances on the right from the corresponding position. The higher the yellowish green color saturation, the higher the conceptual similarity value.

A conceptual similarity quantifies the similarity between two utterances. The higher the value, the higher the similarity between the two utterances. The conceptual similarity varies depending on how closely the two utterances match the similarities of key words representing a debate. Specifically, each utterance is configured of a vector composed of similarities to key words representing a debate, and inner product multiplication of the relevant vectors results in a conceptual similarity.

Figure 2:
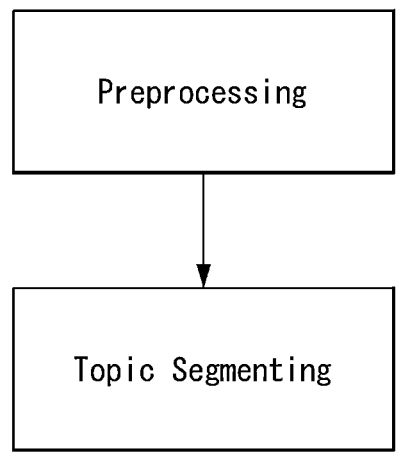
FIG. 2 illustrates an operational flowchart for a method of segmenting debate topics according to an embodiment of this specification.

FIG. 2 illustrates an operational flowchart for a method of segmenting debate topics according to an embodiment of this specification.

The method of segmenting debate topics may be largely divided into data preprocessing and topic segmenting.

Figure 3:
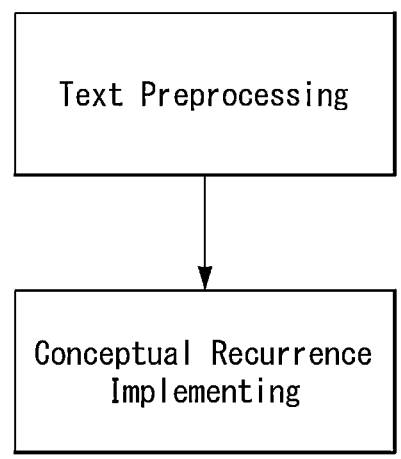
FIG. 3 illustrates an operational flowchart for a method of preprocessing data.

FIG. 3 illustrates an operational flowchart for a method of preprocessing data. In the data preprocessing, text data configuring a debate is preprocessed in a form that may be visually analyzed (Text preprocessing), and the conceptual similarity between utterances may be calculated so that the conceptual recurrence method may be applied (Conceptual Recurrence Implementing).

Based on the collected debate script, errors in the script are removed, and the data structure is created by morphological analysis and sentiment analysis. In addition, based thereon, conceptual recurrence is implemented.

The debate script may be provided in a text form after a debate is over, or may be provided in a text form in near real time from a machine learning model for voice recognition with accuracy improved recently during the debate.

In the text configuring the script, punctuation that do not distinguish sentences and stop words are removed, and all unique individual words may be selected. In the case of Korean, morphological analysis is performed on the utterance content of the script, and the morphological analysis automatically predicts the types of morphemes configuring the sentences.

Among the morphemes derived from morphological analysis, morphemes corresponding to general nouns (NNG) or proper nouns (NNP) may be put into a set of words to be used for conceptual recurrence. This is because, in morphological analysis, these morphemes are the main semantic elements of sentences, including stems from word phrases indicating verbs, adjectives, and adverbs, in addition to nouns. In addition, morphemes determined not to deal with the main content of a debate, such as "tell (telling)," "today," and "now," may be excluded from the set of words by processing the same as stop words, even when the morphemes are included in NNG and NNP.

In addition, by using a machine learning model for sentiment analysis of Google's natural language API, positive or negative sentiment information may be collected for each sentence of an utterance. Each sentence has a value for sentiment between −1 and 1. The closer the value is to −1, the more negative sentiment the sentence has. The closer the value is to 1, the more positive sentiment the sentence has. The closer the value is to 0, the more neutral sentiment the sentence has. This sentiment information is utilized to find an utterance section where arguments and counterarguments follow.

Each utterance may be expressed as a vector of key words so as to be applied to conceptual recurrence. The value for each key word is a value calculated by conceptualizing the relevant word, which is a value obtained by synthesizing words that are conceptually similar even when they are not the words as above. In addition, as an inner product between vectors indicating two utterances, the conceptual similarity indicating a similarity between utterances illustrated in FIG. 1 may be calculated.

The stage of segmenting topics in FIG. 2 will be described in detail with reference to FIGS. 4 and 5.

Figure 4:
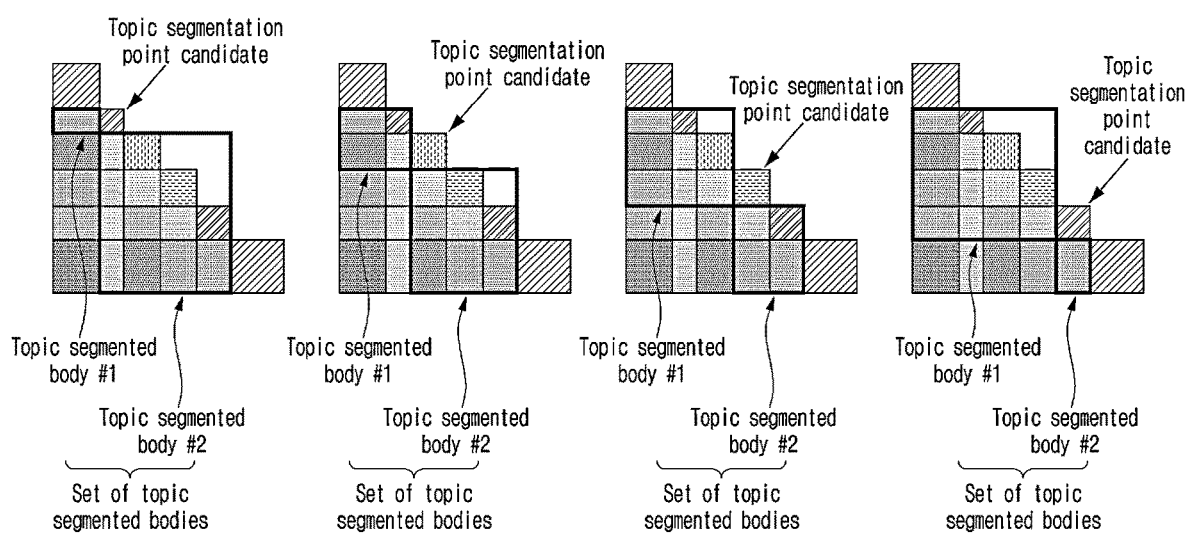
FIG. 4 illustrates an example of searching for a topic segmentation point using a set of topic segmented bodies configured of two adjacent topic segmented bodies.

FIG. 4 illustrates an example of searching for a topic segmentation point using a set of topic segmented bodies configured of two adjacent topic segmented bodies. FIG. 5 is an operational flowchart for a method of segmenting debate topics based on the sum of conceptual similarities and debate consistency metrics.

The topic segmentation model according to an embodiment of this specification is executed as follows.

First, sets of topic segmented bodies are searched for the utterances to be segmented. Herein, the topic segmented body refers to partial utterances segmented from the utterances of the entire script as a single topic, and the set of topic segmented bodies refers to designating two adjacent topic segmented bodies as one unit.

In FIG. 4, a box with a red border without filling the inside indicates the topic segmented bodies (topic segmented body #1 and topic segmented body #2). Since an embodiment of this specification divides the script in such a way that one topic segmented body is divided into two topic segmented bodies, two adjacent topic segmented bodies (topic segmented body #1, and topic segmented body #2) are designated as one unit, and this is called a set of topic segmented bodies. The reason for finding such set of topic segmented bodies is to search for topic segmentation point candidates.

Since the number of utterances in FIG. 4 is six, four sets of topic segmented bodies may be considered.

As a second process, the similarity cohesion is obtained for each set of topic segmented bodies. The similarity cohesion is a value indicating how cohesive the conceptual similarities are.

As a third process, the consistency metrics of a debate are reflected in the similarity cohesion.

As a fourth process, a set of topic segmented bodies having the highest similarity cohesion is found, and the segmentation point of the topic segmented bodies of the corresponding set is decided as a topic segmentation point.

By repeating these processes, it is possible to search for topic segmented bodies and decide the topic segmentation point.

Figure 5:
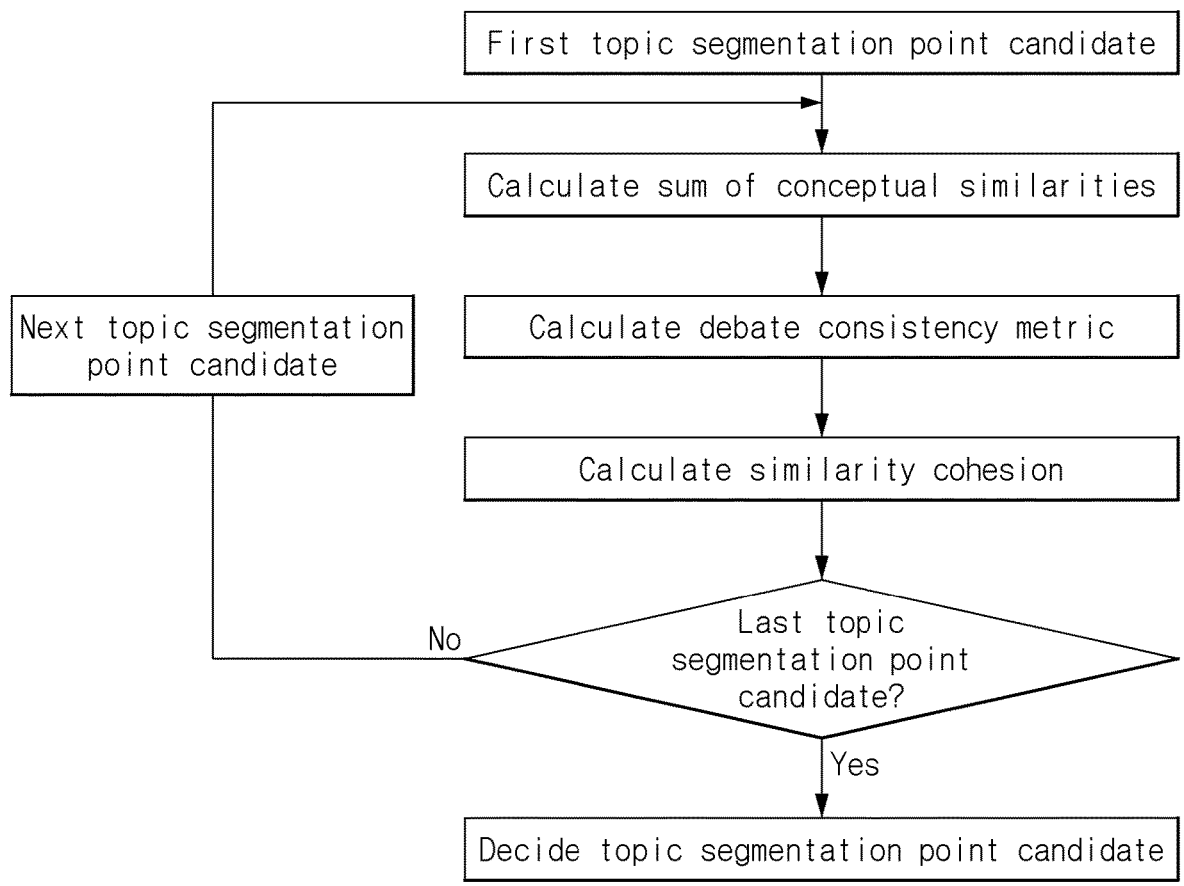
FIG. 5 is an operational flowchart for a method of segmenting debate topics based on the sum of conceptual similarity and debate consistency metrics.

Such a topic segmentation model may be described with an operational flowchart as shown in FIG. 5.

As shown in FIG. 4, when the topic segmented bodies includes six utterances, four sets of topic segmented bodies may be considered. For each set of topic segmented bodies, the similarity cohesion may be calculated, and a topic segmentation point candidate corresponding to the set of topic segmented bodies with the highest cohesion may be decided.

First, a first topic segmentation point candidate is selected to form a set of topic segmented bodies as shown in the leftmost figure in FIG. 4, the sum of conceptual similarities is calculated for each of the two topic segmented bodies, a metric for each attribute of the cohesion of a debate for the relevant set of topic segmented bodies is calculated, and the similarity cohesion for the relevant set of topic segmented bodies is calculated based on the sum of the conceptual similarities and the consistency metrics of the debate.

Next, the topic segmentation point candidate is moved to the next utterance, and the similarity cohesion is obtained by calculating a sum of conceptual similarities and consistency metrics for a set of topic segmented bodies as shown in the second figure from the left in FIG. 4.

The similarity cohesion is obtained for the relevant set of topic segmented bodies by moving up to the last topic segmentation point candidate.

Based on the similarity cohesion obtained for each set of topic segmented bodies, a set of topic segmented bodies with the highest cohesion may be selected, and a topic segmentation point corresponding to the relevant set may be selected.

The process of calculating the sum of the conceptual similarities, the consistency metrics, and the similarity cohesion will be described in detail with reference to FIGS. 6 to 14.

Based on the semantic consistency of a debate and the interaction characteristics of debaters, the section with high conceptual similarity may be determined as the same topic. Semantic consistency is the consistency of a central topic between consecutive statements. The higher the semantic consistency, the higher the internal consistency between utterances. In addition, in order for the interaction between the debaters to be considered a genuine dialogue, their discourses need to be mutually decided in terms of content. These characteristics are the basis that a section with high conceptual similarity of conceptual recurrences indicating reciprocity of utterance may be considered as one dialogue, namely, one topic.

The cohesion of conceptual similarities, namely, the similarity cohesion, is a value obtained by calculating the cohesion of conceptual similarities within the topic segmented bodies, and may be obtained by dividing the sum of the conceptual similarities for the topic segmented bodies by the number of conceptual similarities as shown in Equation 1 below.

$$\text{(similarity cohesion of a topic segment)} = \frac{\text{sum }(t)}{\text{count }(t)} \quad \text{[Equation 1]}$$

Herein, t denotes a topic segmented body, sum is a function that calculates the sum of conceptual similarities, and count is a function that calculates the count of conceptual similarities.

The sum of the conceptual similarities corresponds to a numerator in an equation for calculating the similarity cohesion. Three methods of a plane method, a line method and a point method are proposed as methods of calculating the sum of conceptual similarities of topic segmented bodies, and a method of mixing the three methods is additionally proposed.

Figure 6:
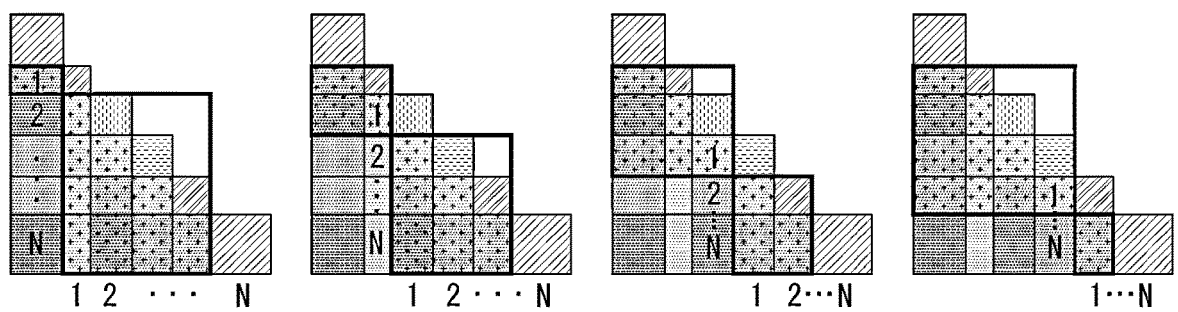
FIG. 6 illustrates an example of summing the conceptual similarity of the topic segmented body in units of planes.
Figure 7:
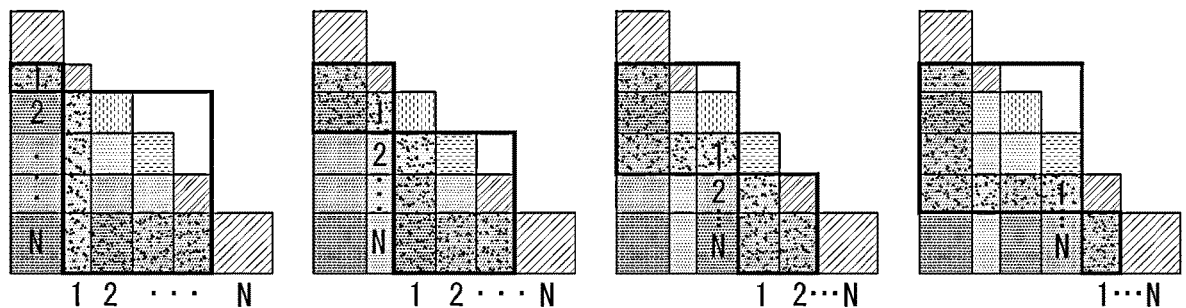
FIG. 7 illustrates an example of summing the conceptual similarity of the topic segmented body in units of lines.
Figure 8:
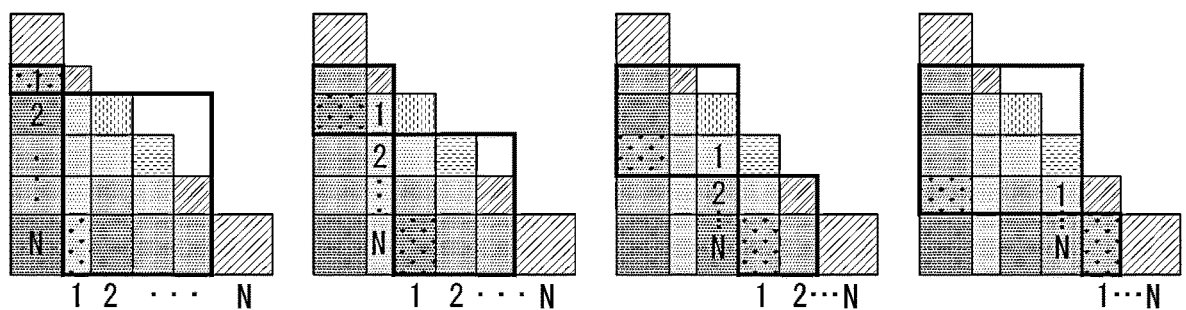
FIG. 8 illustrates an example of summing the conceptual similarity of the topic segmented body in units of points.
Figure 9:
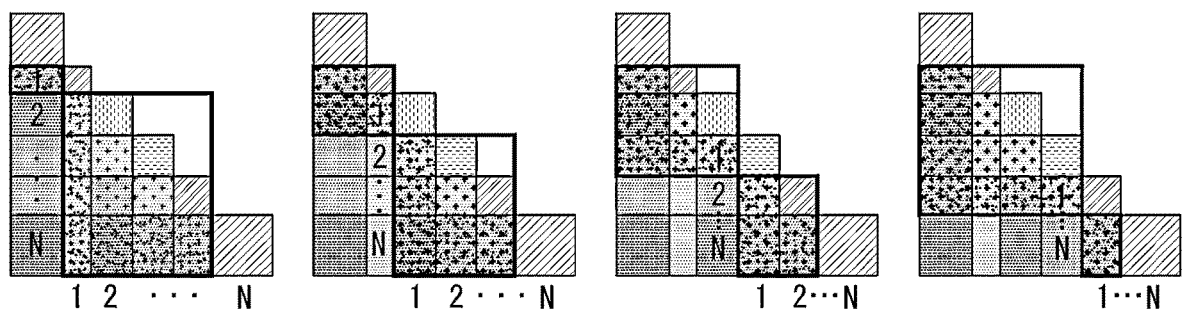
FIG. 9 illustrates an example of summing the conceptual similarity of the topic segmented body into a combination of planes, lines, and points.

FIGS. 6 to 9 are diagrams for explaining a method of obtaining the sum of conceptual similarities. FIG. 6 illustrates an example of summing the conceptual similarity of the topic segmented body in units of planes. FIG. 7 illustrates an example of summing the conceptual similarity of the topic segmented body in units of lines. FIG. 8 illustrates an example of summing the conceptual similarity of the topic segmented body in units of points. FIG. 9 illustrates an example of summing the conceptual similarity of the topic segmented body into a combination of planes, lines, and points.

FIG. 6 may be referred to as a plane method, and all conceptual similarities included in the topic segmented body may be added. In FIG. 6, each red square represents a topic segmented body, and yellowish green squares with a blue dot in the red square represent conceptual similarities used in the plane method. The equation for calculating the sum of conceptual similarities of the plane method is as follows.

$$\text{(sum of conceptual similarities by Plane method)} = \sum_{j=2}^{N} \sum_{i=1}^{j-1} \text{plane }(i, j) \cdot S(i, j) \quad \text{[Equation 2]}$$

Herein, i denotes the number of a horizontal row, j denotes the number of a vertical column, N represents the number of utterances in the topic segmented body, $S(i, j)$ denotes the conceptual similarity between the i-th and j-th utterances, and plane$(i, j)$ is a function that designates a weighting to the conceptual similarity between the i-th and j-th utterances. The equation for plane$(i, j)$ is as follows.

$$\text{plane}(i,j) = \text{planeWeight, where } \forall i, \forall j \quad \text{[Equation 3]}$$

In the plane method, all conceptual similarities are added up, so the conceptual similarities for all i and j combinations are included in the calculation. planeWeight means a weighting to be applied to the conceptual similarity applied to the plane method. In an embodiment of this specification, an operator may designate this weighting.

FIG. 7 may be referred to as a line method, and conceptual similarities belonging to an edge of a topic segmented body region may be added in an L shape. The line method was devised after considering that there was a high conceptual similarity between the main utterances and other utterances in the adjacent time period. In FIG. 7, yellowish green squares with red dots in red squares indicate conceptual similarities used in the line method. The equation for calculating the sum of the conceptual similarities of the line method is as follows.

$$\text{(sum of conceptual similarities by Line method)} = \sum_{j=2}^{N} \sum_{i=1}^{j-1} \text{line }(i, j) \cdot S(i, j) \quad \text{[Equation 4]}$$

Herein, line$(i, j)$ is a function that designates a weighting to the conceptual similarity between the i-th and j-th utterances, and the equation for line$(i, j)$ is as follows.

$$\text{line }(i, j) = \begin{cases} \text{lineWeight,} & \text{if } 1 \leq i \leq N-1 \text{ and } j = N \\ \text{lineWeight,} & \text{if } i = 1 \text{ and } 2 \leq j \leq N \\ 0, & \text{otherwise} \end{cases} \quad \text{[Equation 5]}$$

Herein, lineWeight means a weighting to be applied to the conceptual similarity applied to the line method, and a user may designate this weighting.

FIG. 8 may be referred to as a point method, and is a method of selecting one conceptual similarity (conceptual similarity between the start utterance and the end utterance of the topic segmented body) at the bottom leftmost of the topic segmented body region. Although it has been described as a method of calculating the sum of conceptual similarities, the point method substantially selects only one conceptual similarity. The point method was devised in consideration of the pattern of a high conceptual similarity between other utterances and main utterances with a high similarity. This has the benefit of segmenting topics based on main utterances with a high similarity to other utterances.

In FIG. 8, yellowish green squares with orange dots in red squares indicate conceptual similarities used in the point method. The equation for calculating the sum of conceptual similarities of the point method is as follows.

$$\text{(sum of conceptual similarities by Point method)} = \sum_{j=2}^{N} \sum_{i=1}^{j-1} point\,(i,j) \cdot S(i,j) \quad \text{[Equation 6]}$$

Herein, point(i, j) is a function that designates a weighting to the conceptual similarity between the i-th and j-th utterances, and the equation for point(i, j) is as follows.

$$point\,(i,j) = \begin{cases} pointWeight & \text{if } i=1 \text{ and } j=N \\ 0, & \text{otherwise} \end{cases} \quad \text{[Equation 7]}$$

Here, pointWeight means a weighting to be applied to the conceptual similarity applied to the point method, and a user may designate this weighting.

FIG. 9 may be referred to as a mixing method to which all of the plane method, the line method, and the point method are applied, and the equation for calculating the sum of conceptual similarities according to the mixing method is as follows.

$$sum\,(t) = \sum_{j=2}^{N} \sum_{i=1}^{j-1} (plane\,(i,j) + line\,(i,j) + point\,(i,j)) \cdot S(i,j) \quad \text{[Equation 8]}$$

Herein, sum(t) corresponds to a function indicating the sum of conceptual similarities introduced in Equation 1.

Next, a method of obtaining the sum (count(t)) of the conceptual similarities corresponding to a denominator of the similarity cohesion in Equation 1 will be described.

The number of conceptual similarities varies according to the plane method, the line method, and the point method, which are methods of summing the conceptual similarities. This is because the conceptual similarities used for each method are different. For the plane method, the number of conceptual similarities is ((N−1)×N/2), where N denotes the number of utterances in the topic segmented body. For the line method, the number of conceptual similarities is (2N−3). For the point method, the number of conceptual similarities is one.

Since the mixing method is affected by a weighting when calculating the number of conceptual similarities for each method, the equation for calculating the number of conceptual similarities in the mixing method is as follows.

$$count\,(t) = \frac{(N-1) \cdot N}{2} \times planeWeight + (2N-3) \times lineWeight + pointWeight \quad \text{[Equation 9]}$$

Herein, planeWeight, lineWeight, and pointWeight are the weightings described in Equations 3, 5, and 7. This equation corresponds to the function count(t) indicating the number of conceptual similarities introduced in Equation 1.

As described above, there are attributes indicating the internal consistency of a debate that may affect the segmentation of topics. These attributes include other-continuity, self-continuity, a chain of arguments and counterarguments, and a topic guide of a moderator. This specification expresses these attributes as a metric, which is a quantified numerical value, and is referred to as a consistency metric.

Figure 10:
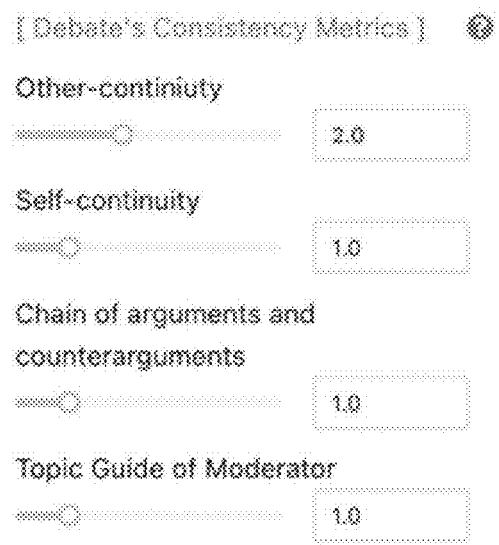
FIG. 10 illustrates an example in which the topic segmentation point moves when a weighting of the continuity attribute of others is adjusted among the consistency metrics which quantify the attribute indicating the internal consistency of a debate.
Figure 10:
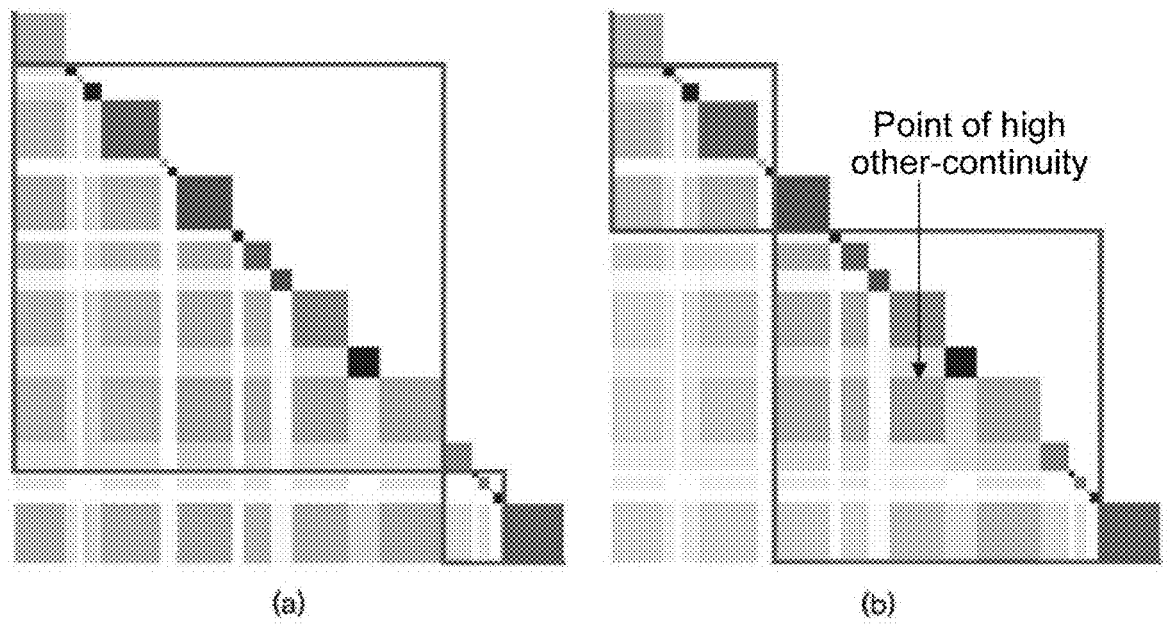

First, FIG. 10 illustrates an example in which the topic segmentation point moves when a weighting of the continuity attribute of others is adjusted among the consistency metrics which quantify the attribute indicating the internal consistency of a debate.

Other-continuity is the consistency between statements made in succession by different speakers. The higher the other-continuity, which is an act of considering the other person's discourse among interlocutors, the higher the internal consistency indicating the interactional aspect of a debate. An embodiment of this specification apply the other-continuity to the conceptual similarity between different speakers.

FIG. 10 compares (a) before application of the other-continuity to the conceptual similarity and (b) after application thereof ((a) when the same weighting (1) is applied to all the attributes configurating a consistency metric, and (b) when the weighting of the other-continuity is applied as a different value (2) among the attributes configuring the consistency metric). As shown in FIG. 10, when a weighting value for the other-continuity is increased, the weighting of the conceptual similarities between others with a close distance between utterances is increased, which may be expressed as the following equation.

$$other\,(i,j) = \begin{cases} appliedWeight, & \text{if } speaker\,(i) \neq speaker\,(j) \\ & \text{and } appliedWeight > 1 \\ 1, & \text{if } speaker\,(i) \neq speaker\,(j) \\ & \text{and } appliedWeight \leq 1 \end{cases} \quad \text{[Equation 10]}$$

$$\text{where, } appliedWeight = otherWeight - \frac{distance\,(i,j)}{\alpha}$$

Herein, other(i, j) is a function that designates a continuity weighting of others to the conceptual similarity between the i-th and j-th utterances, speaker(i) denotes a speaker of the i-th utterance, and otherWeight means a weighting to be applied to the conceptual similarity corresponding to the other-continuity, wherein a user may designate this weighting. In addition, distance(i, j) is a function that calculates the distance between the i-th and j-th utterances. The distance between adjacent utterances returns 0 and increases by 1 whenever another utterance enters between the i-th and j-th utterances, and then returns. In addition, appliedWeight is a value adjusted to be more affected by a weighting for the other-continuity as the distance between utterances is shorter, and a is a value that designates the degree to which the other-continuity is greatly affected as the distance between utterances is shorter.

Figure 11:
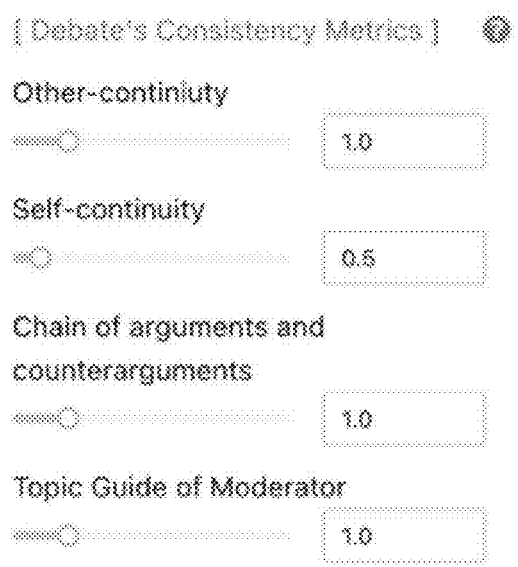
FIG. 11 illustrates an example in which the topic segmentation point moves when a weighting of the self-continuity attribute is adjusted among the consistency metrics.
Figure 11:
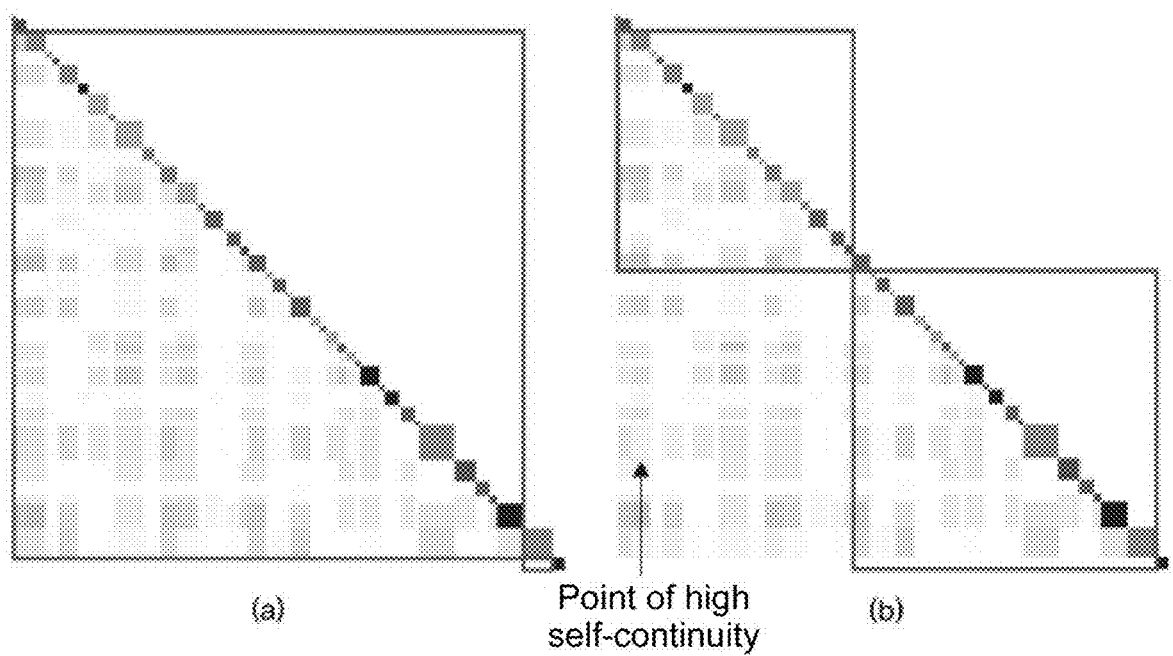

FIG. 11 illustrates an example in which the topic segmentation point moves when a weighting of the self-continuity attribute is adjusted among the consistency metrics.

Self-continuity is the consistency between individual speaker's statements. When self-continuity increases, where the disconnection from the previous statement is deepened while only speaking one's own words rather than considering the other person's discourse, internal consistency decreases. An embodiment of this specification apply self-continuity to the conceptual similarity between the same speakers.

FIG. 11 compares (a) before application of the self-continuity to the conceptual similarity and (b) after application thereof ((a) when the same weighting (1) is applied to all the attributes configurating a consistency metric, and (b) when the weighting of the self-continuity is applied as a different value (0.5) among the attributes configuring the consistency metric). As shown in FIG. 11, when a weighting value for the self-continuity is decreased, the weighting of the conceptual similarities between self-utterances with a far distance between utterances is decreased, which may be expressed as the following equation.

[Equation 11]

$$\text{self}(i, j) = \begin{cases} \text{selfWeight}, & \text{if speaker}(i) = \text{speaker}(j) \\ & \text{and } \text{appliedWeight} \leq \text{selfWeight} \\ \text{appliedWeight}, & \text{if speaker}(i) = \text{speaker}(j) \\ & \text{and } \text{appliedWeight} > \text{selfWeight} \\ & \text{and } \text{appliedWeight} < 1 \\ 1, & \text{if speaker}(i) = \text{speaker}(j) \\ & \text{and } \text{appliedWeight} > \text{selfWeight} \\ & \text{and } \text{appliedWeight} \geq 1 \end{cases}$$

$$\text{where, appliedWeight} = 1 + \frac{\beta - \text{distance}(i, j)}{\alpha}$$

Herein, self(i, j) is a function that designates a self-continuity weighting to the conceptual similarity between the i-th and j utterances, speaker(i) denotes a speaker of the i-th utterance, and selfWeight means a weighting to be applied to the conceptual similarity corresponding to the self-continuity, wherein a user may designate this weighting. In addition, distance(i, j) is a function that calculates the distance between the i-th and j-th utterances. The distance between adjacent utterances returns 0 and increases by 1 whenever another utterance enters between the i-th and j-th utterances, and then returns. In addition, appliedWeight is a value adjusted to be more affected by a weighting for the self-continuity as the distance between utterances is farther, a is a value that designates the degree to which the self-continuity is greatly affected as the distance between utterances is farther, $\beta$ is a value that designates the distance between utterances at which the self-continuity begins to be applied.

Figure 12:
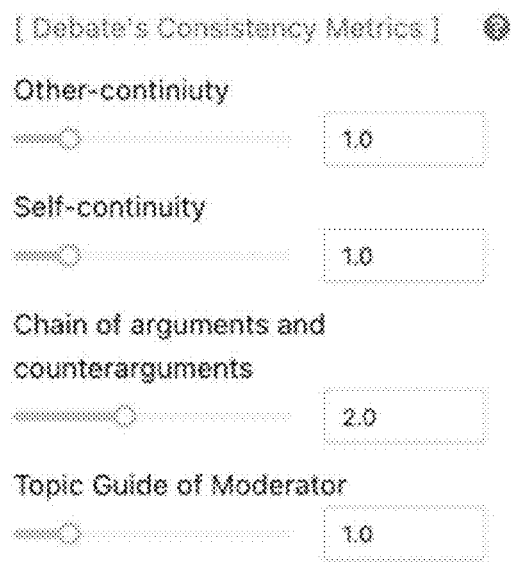
FIG. 12 illustrates an example in which the topic segmentation point moves when a weighting of a chain attribute of arguments and counterarguments is adjusted among the consistency metrics.
Figure 12:
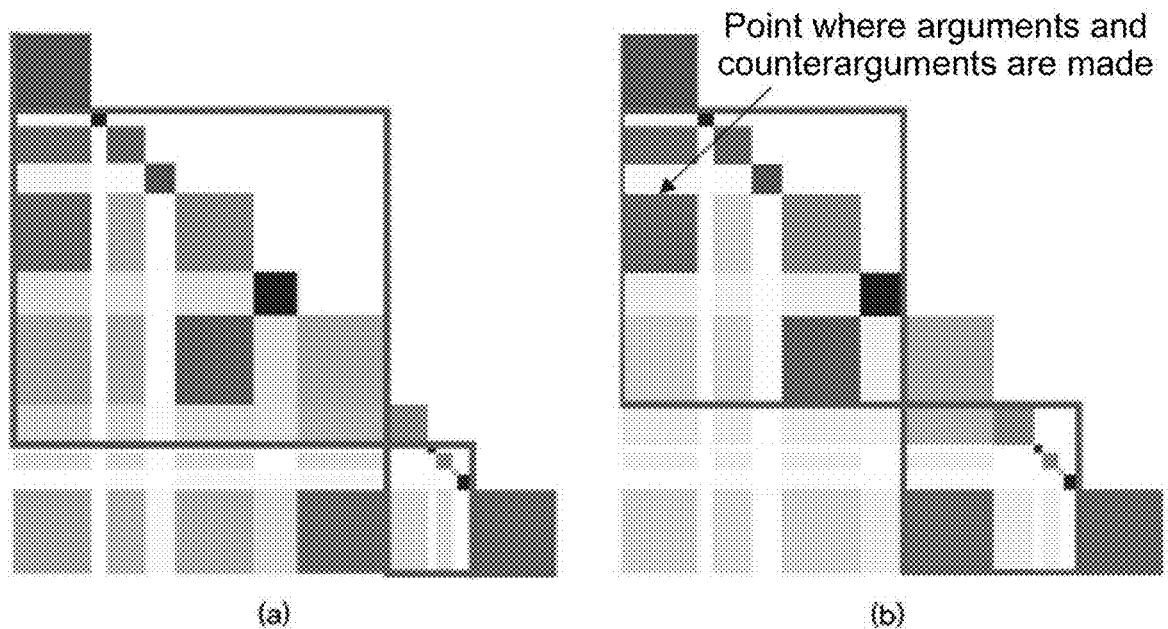

FIG. 12 illustrates an example in which the topic segmentation point moves when a weighting of a chain attribute of arguments and counterarguments is adjusted among the consistency metrics.

The chain of arguments and counterarguments is a phenomenon in which arguments and counterarguments appear continuously. Reciprocal and continuous arguments and counterarguments of the other person's utterances improve internal consistency. FIG. 12 compares (a) before application of the chain of arguments and counterarguments to the conceptual similarity and (b) after application thereof ((a) when the same weighting (1) is applied to all the attributes configurating a consistency metric, and (b) when the weighting of the chain of arguments and counterarguments is applied as a different value (2) among the attributes configuring the consistency metric).

When a weighting value for the chain of arguments and counterarguments is increased, the weighting of the conceptual similarities that are determined as utterances that are arguing and refuting is increased. The red squares filled inside and mixed with the conceptual similarities indicated by the yellowish green square filled inside are the conceptual similarities corresponding to arguments and counterarguments. A chain of arguments and counterarguments may be considered with reference to the conditions for arguments and counterarguments as follows.

Counterarguing the opposing party's utterances
The utterance of a refuter has a negative sentiment.
The amount of utterance of a speaker of the opposing party being refuted is longer than a certain level.
There is a certain level or a higher level of a conceptual similarity between the utterances of the refuter and the opposing party.
An utterance including counterarguments is at a certain level close to an utterance including arguments.

Based on the conditions for these arguments and counterarguments, the equation for searching the conceptual similarity corresponding to the arguments and counterarguments may be expressed as follows.

$$\text{chain}(i, j) = \begin{cases} \text{chainWeight}, & \text{if side}(i, j) \wedge \text{negative}(j) \wedge \text{long}(i) \\ & \wedge \text{similarity}(i, j) \wedge \text{close}(i, j) \wedge \text{right}(i, j) \\ 1, & \text{otherwise} \end{cases}$$

[Equation 12]

Herein, chain(i, j) is a function that searches for cases where the i-th utterance asserts and the j-th utterance refutes, and a weighting chainWeight is given to a conceptual similarity with conditions corresponding to arguments and counterarguments, wherein a user may designate this weighting. In addition, ^ denotes a logical AND, meaning that it is true only when both the left and right conditions are true, and the other conditions are false. In addition, the conditional functions of side(i, j), negative(j), long(i), similarity(i, j), close(i, j), and right(i, j) that search for arguments and counterarguments may be expressed as the following equations:

[Equation 13]

$$\text{side }(i, j) =$$
$$\begin{cases} \text{True} & \text{if speaker of } u_i \text{ and speaker of } u_j \text{ are not on the same side} \\ \text{False,} & \text{otherwise} \end{cases}$$

$$\text{negative }(j) = \begin{cases} \text{True,} & \text{if } \sum_{k=1}^{l} \text{sentenceSentiment}(k) \leq -\alpha \\ \text{False,} & \text{otherwise} \end{cases}$$

$$\text{where, sentenceSentiment}(k) = \begin{cases} \text{sentimentScore,} & \text{if sentimentScore} \leq \beta \\ 0, & \text{otherwise} \end{cases}$$

$$\text{long }(i) = \begin{cases} \text{True,} & \text{if (the number of characters of } ith \text{ utterance)} \geq \gamma \\ \text{False,} & \text{otherwise} \end{cases}$$

$$\text{similarity }(i, j) = \begin{cases} \text{True,} & \text{if } S(i, j) \geq \delta \\ \text{False,} & \text{otherwise} \end{cases}$$

$$\text{close }(i, j) = \begin{cases} \text{True,} & \text{if distance }(i, j) \leq \epsilon \\ \text{False,} & \text{otherwise} \end{cases}$$

$$\text{right }(i, j) = \begin{cases} \text{True,} & \text{if } \sum_{k=i+1}^{j-1} \text{isChain}(k, j) = 0 \\ \text{False,} & \text{otherwise} \end{cases}$$

where, $$\text{isChain}(i, j) = \begin{cases} 1, & \text{if side }(i, j) \wedge \text{negative }(j) \wedge \text{long }(i) \wedge \text{similarity }(i, j) \\ & \wedge \text{close }(i, j) \wedge \text{right }(i, j) \\ 0, & \text{otherwise} \end{cases}$$

Herein, the function side(i, j) is a function that returns true if the speaker of the i-th utterance ui and the j-th utterance uj are on the other side, or false otherwise.

In addition, negative(j) is a function for determining whether the j-th utterance uj is a negative utterance, and l in the relevant function indicates the number of sentences of the utterance uj. In addition, negativeSentence(k) is a function that returns the value when the k-th sentence is predicted as a negative sentiment value or probability less than or equal to $\beta$, and this value or probability varies depending on the type of sentiment analysis model. When the sum of all negative sentiment scores of sentences in an utterance is less than or equal to a, it is determined that the utterance has a negative sentiment. The prototype may be designated as $\alpha=0.5$, $\beta=0.25$ based on Google's Natural language sentiment analysis model.

In addition, long(i) is a function that determines whether the amount of utterance of the i-th utterance is long enough to be refuted, and the unit of the amount of utterance is the number of characters and may be designated as $\gamma=100$.

In addition, similarity(i, j) is a function that determines whether the conceptual similarity between the utterances of the refuter and the opposing party is greater than or equal to a certain level value $\delta$, and may be designated as $\delta=0.3$.

In addition, close(i, j) is a function that determines whether an utterance including counterarguments is at a certain level close to an utterance including arguments, and distance(i, j) is a function that calculates the distance between the i-th and j-th utterances. The distance between adjacent utterances returns 0 and increases by 1 whenever another utterance enters between the i-th and j-th utterances, and then returns. $\epsilon$ is a value that determines whether the distance is close, and may be designated as 10.

In addition, right(i, j) is a function that searches whether there is a conceptual similarity between the arguments and counterarguments among the utterances ui+1 to uj−1. When it is determined that there is an utterance that has already been refuted, this function is necessary because it is difficult to directly refute utterances earlier than that.

The values of Greek letters $\alpha$, $\beta$, $\gamma$, $\delta$, and $\epsilon$ may be set during an implementation process and only need to maintain a certain level of value. For example, $\epsilon$, which indicates the level at which the distance between utterances is determined to be close, may be slightly different for each debate and may be determined differently for each implementer.

Figure 13:
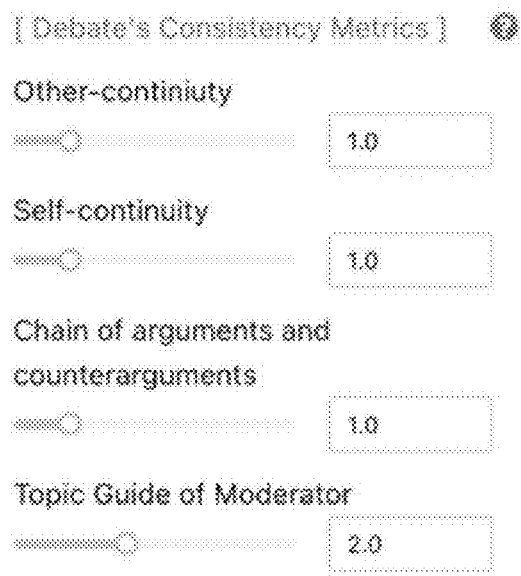
FIG. 13 illustrates an example in which the topic segmentation point moves when a weighting of a topic guide attribute of a moderator is adjusted among the consistency metrics.
Figure 13:
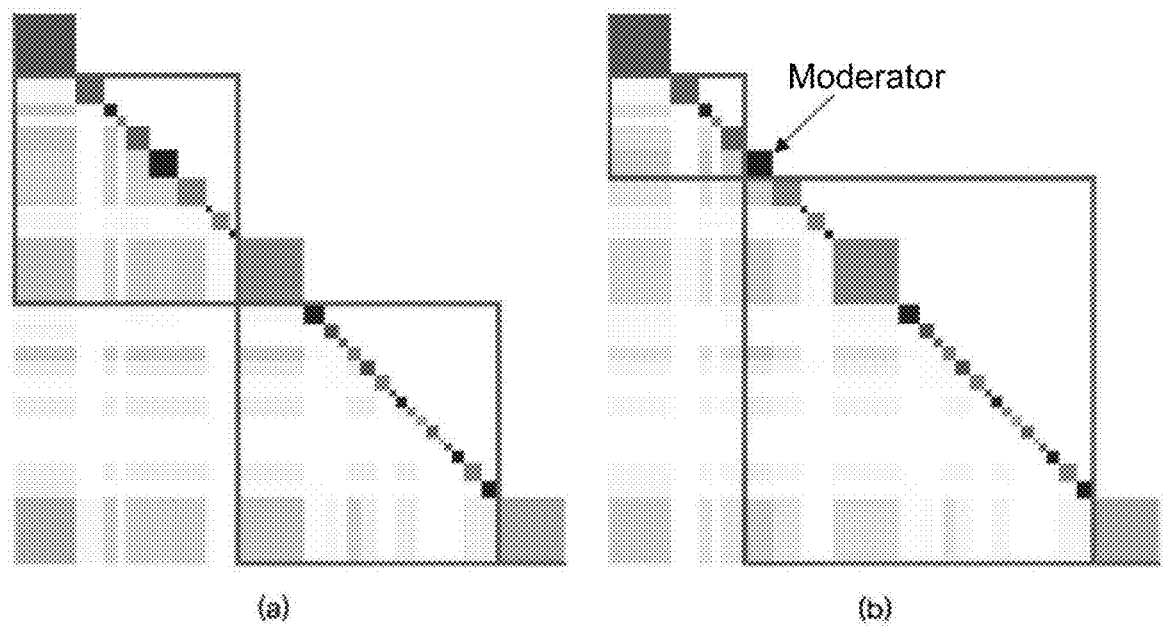

FIG. 13 illustrates an example in which the topic segmentation point moves when a weighting of a topic guide attribute of a moderator is adjusted among the consistency metrics.

The topic guide attribute of the moderator is the characteristic in which an moderator presents a topic direction of a debate to debaters. When the moderator speaks with enough utterance to present a topic, it may be determined that the possibility of presenting the topic is high.

FIG. 13 compares (a) before application of the topic guide of the moderator to the conceptual similarity and (b) after application thereof ((a) when the same weighting (1) is applied to all the attributes configurating a consistency metric, and (b) when the weighting of the topic guide of the moderator is applied as a different value (2) among the attributes configuring the consistency metric). As shown in FIG. 13, when a weighting value of the topic guide of the moderator is increased, the weighting of the conceptual similarities between the moderator's utterance and other utterances is increased, which may be expressed as the following equation.

$$\text{moderator } (i, j) = \quad \text{[Equation 14]}$$

$$\begin{cases} moderatorWeight, & \text{if } isModerator(i) \wedge \text{long } (i) \\ moderatorWeight, & \text{if } isModerator(j) \wedge \text{long } (j) \\ 1, & \text{otherwise} \end{cases}$$

where, $isModerator(k) =$ $$\begin{cases} \text{True,} & \text{if } kth \text{ utterance is spoken by moderator} \\ \text{False,} & \text{otherwise.} \end{cases}$$

where, long $(i) =$ $$\begin{cases} \text{True,} & \text{if (the number of characters of } ith \text{ utterance)} \geq \gamma \\ \text{False,} & \text{otherwise} \end{cases}$$

Herein, moderatorWeight means a weighting to be applied to the conceptual similarity corresponding to the topic guide of the moderator, and a user may designate this weighting. In addition, isModerator(k) is a function that determine whether the k-th utterance is the utterance of moderators, long(i) denotes a function that determines whether the amount of utterance of the i-th utterance is sufficient to present a topic, wherein the unit of the amount of utterance is the number of characters and the γ value of long(i) may be designated as 100.

By applying the consistency metrics of a debate to the function sum(t) that calculates the sum of the conceptual similarities described above, it may be redefined as the following equation.

$$\text{sum } (t) = \sum_{j=2}^{N} \sum_{i=1}^{j-1} (\text{plane } (i, j) + \text{line } (i, j) + \text{point } (i, j)) \cdot \quad \text{[Equation 15]}$$

$$(\text{other } (i, j) \cdot \text{self } (i, j) \cdot \text{chain } (i, j) \cdot \text{moderator } (i, j)) \cdot S(i, j)$$

Herein, sum(t) denotes to a function that calculates the sum of the conceptual similarities of the topic segmented body by applying the consistency metrics of a debate. In addition, (plane(i, j)+line(i, j)+point(i, j)) is a formula for calculating the sum of conceptual similarities by a mixing method, (other(i, j)·self(i, j)·chain(i, j)·moderator(i, j)) is a formula for the consistency metrics of the debate, and S(i, j) denotes the conceptual similarity between the i-th utterance and the j-th utterance.

Figure 14:
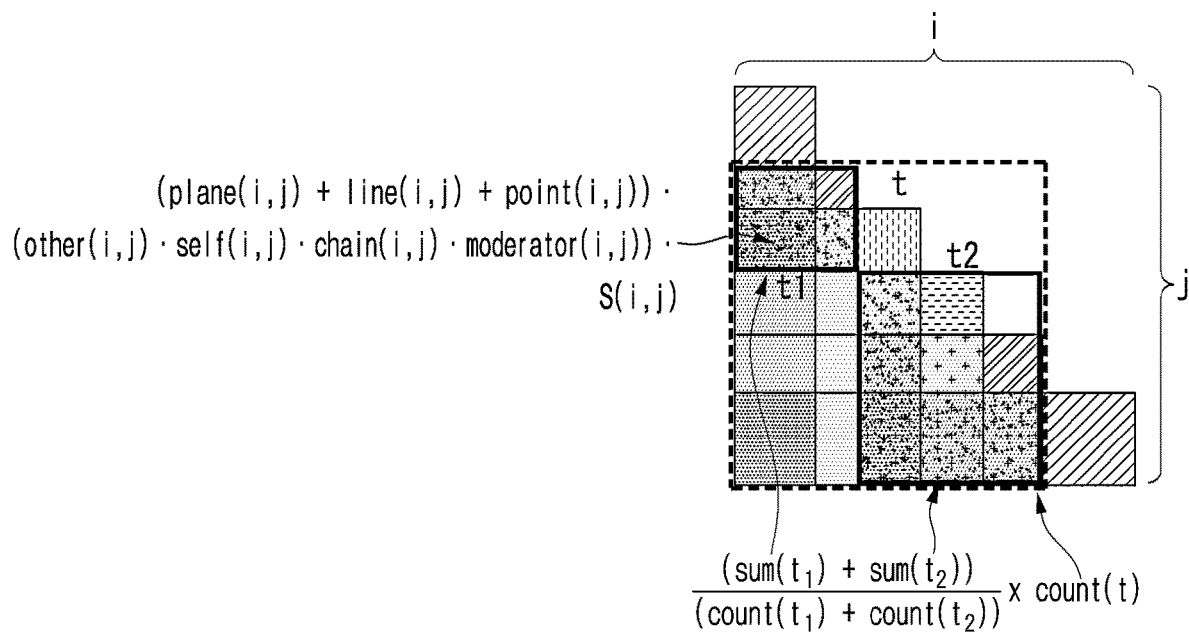
FIG. 14 illustrates a process of obtaining the similarity cohesion of a set of topic segmented bodies.

FIG. 14 illustrates a process of obtaining the similarity cohesion of a set of topic segmented bodies.

A method of actually proceeding with topic segmentation is to calculate the similarity cohesion in a set unit of topic segmented bodies, and find a set of topic segmented bodies having the highest similarity cohesion.

FIG. 14 illustrates two adjacent topic segmented bodies t1 and t2 and a parent topic segmented body t included in a set of topic segmented bodies. Two red squares of which insides are not filled indicate t1 and t2, a blue square of which an inside is not filled indicates t, and the two red squares are collectively called a set of topic segmented bodies.

Rather than calculating the similarity cohesion of one topic segmented body, the similarity cohesion is calculated for a set of topic segmented bodies, which means two adjacent topic segmented bodies. When the similarity cohesion is highest in both the front and rear portions of the segmented point, it is most likely the relevant point at which the topic is segmented. Accordingly, the similarity cohesion for the front and rear portions of the segmentation point needs to be considered simultaneously. Accordingly, the equation for calculating the similarity cohesion of the set of topic segmented bodies is as follows.

$$\text{(similarity cohesion of a small set of topic segments)} = \quad \text{[Equation 16]}$$

$$\frac{(\text{sum } (t_1) + \text{sum } (t_2))}{(\text{count } (t_1) + \text{count } (t_2))} \times \text{count } (t)$$

The set of topic segmented bodies consists of two adjacent topic segmented bodies t1 and t2, the sum function is a function that calculates the sum of the conceptual similarities described above, the count function is a function that calculates the number of conceptual similarities described above, and t denotes a parent topic segmented body that encompasses both the topic segmented bodies t1 and t2 regions of the set of topic segmented bodies. The number of conceptual similarities to the parent topic segmented body t is included in the formula, in order to preferentially divide the script with a larger region.

The segmentation point of the topic segmented bodies of a set of topic segmented bodies with the highest similarity cohesion among each set of topic segmented bodies becomes the topic segmentation point. By repeating this process n times, n number of topic segmentation points and n+1 number of topic segmented bodies may be generated.

Figure 15:
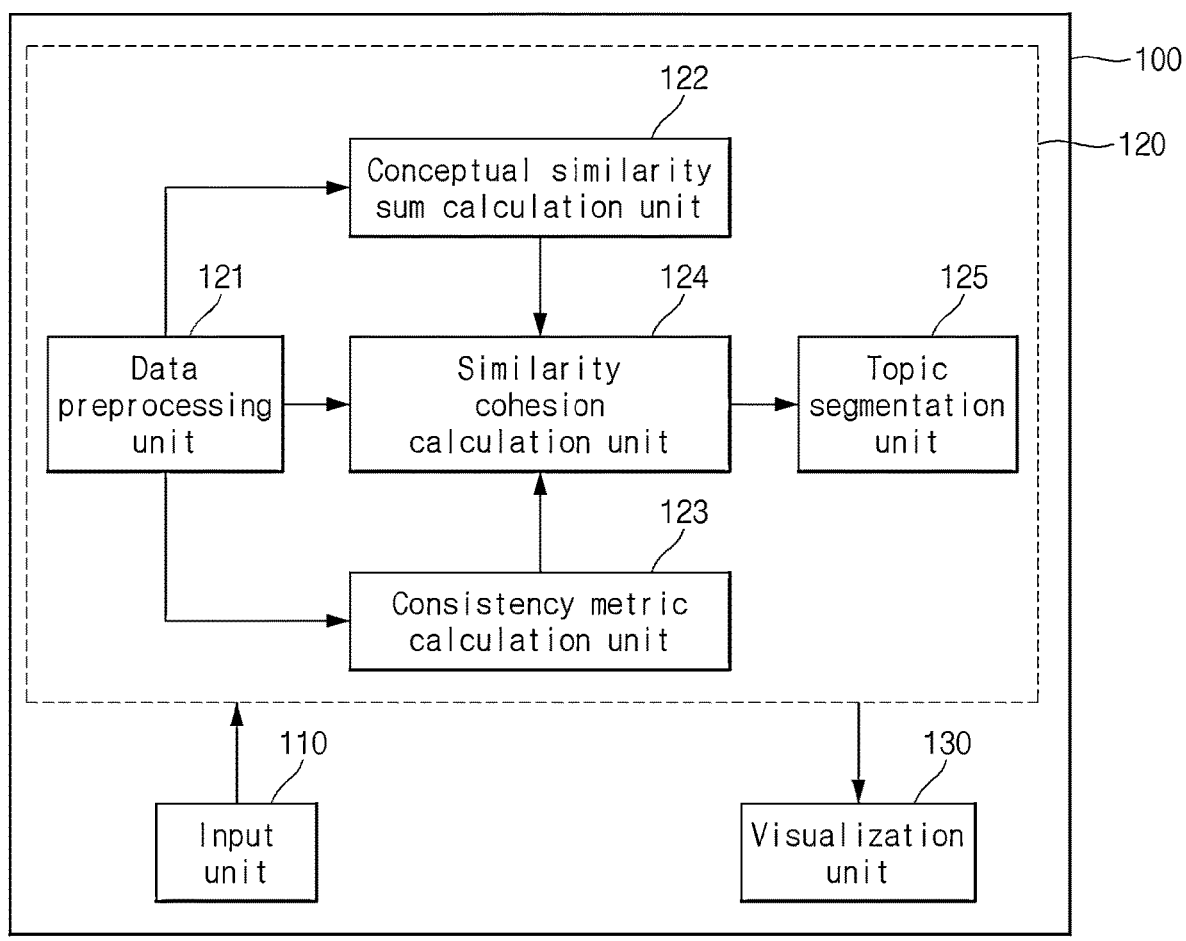
FIG. 15 is a functional block schematically illustrating a device of performing a method of segmenting debate topics according to an embodiment of this specification.

FIG. 15 is a functional block schematically illustrating a device of performing a method of segmenting debate topics according to an embodiment of this specification.

A device 100 of segmenting topics includes an input unit 110 for receiving a text for a debate to be segmented into the topics and receiving a user input so that an operator adjusts a weighting, a processor 120 for segmenting the topics by preprocessing text data configuring the debate into a form that may be visually analyzed and calculating a conceptual similarity, a consistency metric, and similarity cohesion between utterances so that a conceptual recurrence method may be applied, and a visualization unit 130 for visualizing the entire utterances configuring the debate, conceptual similarity between the utterances, and a topic segmented body in which the topics are segmented by being processed by the processor 120.

The device 100 of segmenting topics may perform a function of segmenting topics of a debate only with a portion of its components, and may implement the function more abundantly by adding components.

Through the input unit 110, an operator may input the text of a debate for which the topic is to be segmented, input the number of topic segmented bodies, select a method for obtaining the sum of conceptual similarities, and input a weighting of consistency metrics.

Content for which a topic is to be segmented or an index for a part in which a topic is changed is inserted may be input in the form of an already completed voice file or a video file, or data in progress may be input to the device 100 of segmenting topics in the form of streaming.

The device 100 of segmenting topics may further include, for example, a voice recognition module (not shown) to extract a text for an utterance included in the content and a subject of the relevant utterance, and provide the processor 120 with the same.

Alternatively, the device 100 of segmenting topics may further include a communication unit (not shown) to transmit voice data for input content to an external server and to receive a text for utterances included in the voice data and data for distinguishing a utterance subject from the external server.

The processor 120 may include a data preprocessing unit 121, a conceptual similarity sum calculation unit 122, a consistency metric calculation unit 123, a similarity cohesion calculation unit 124, and a topic segmentation unit 125, and each component may perform an embodiment of segmenting topics of a debate described with reference to FIGS. 2 to 14.

The visualization unit 130 may generate and provide a user interface to output a result of segmenting topics of a debate and to allow an operator to intervene in the process of segmenting the topics of the debate.

Figure 16:
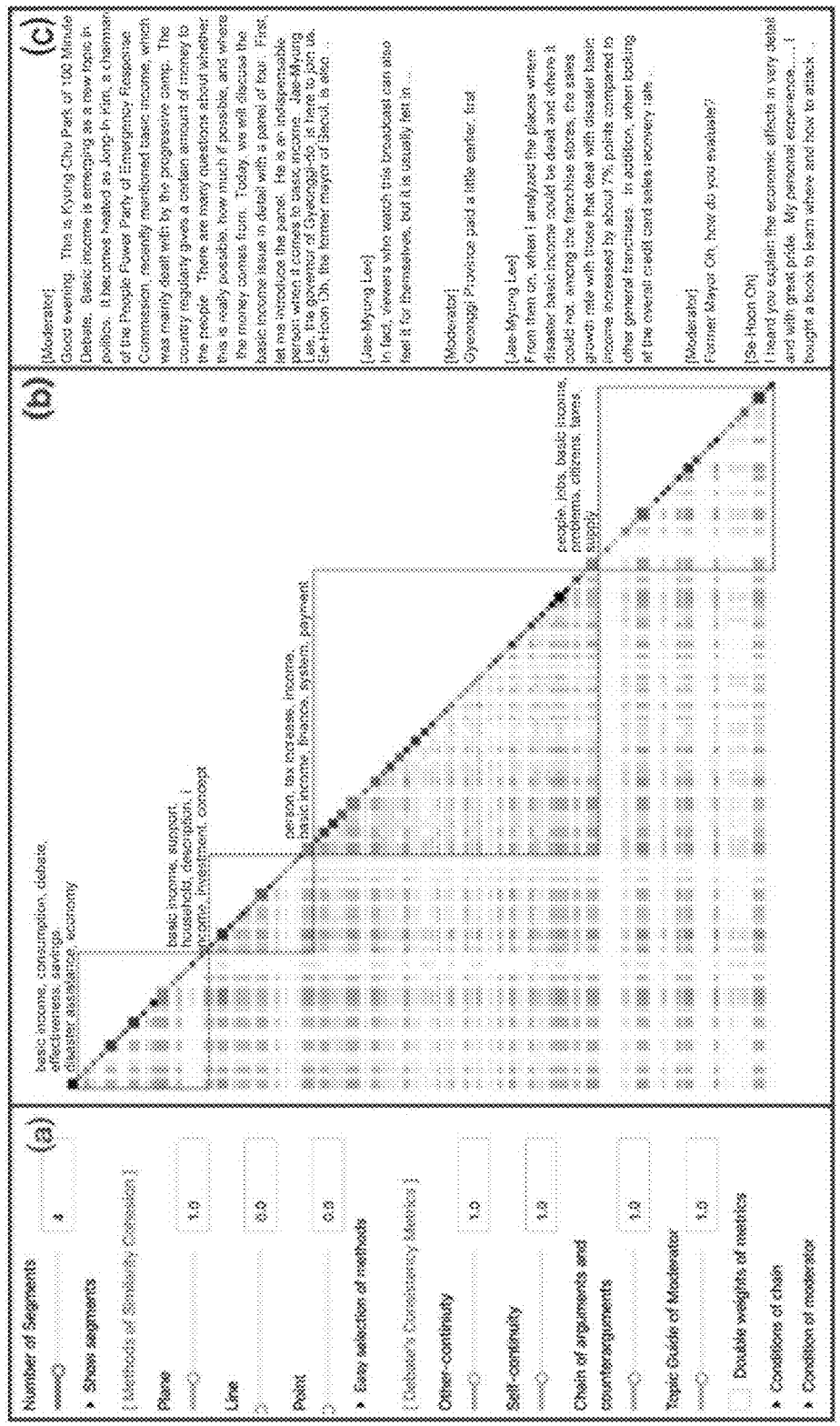
FIG. 16 illustrates a user interface to which the method of segmenting debate topics according to this specification is applied.
Figure 17:
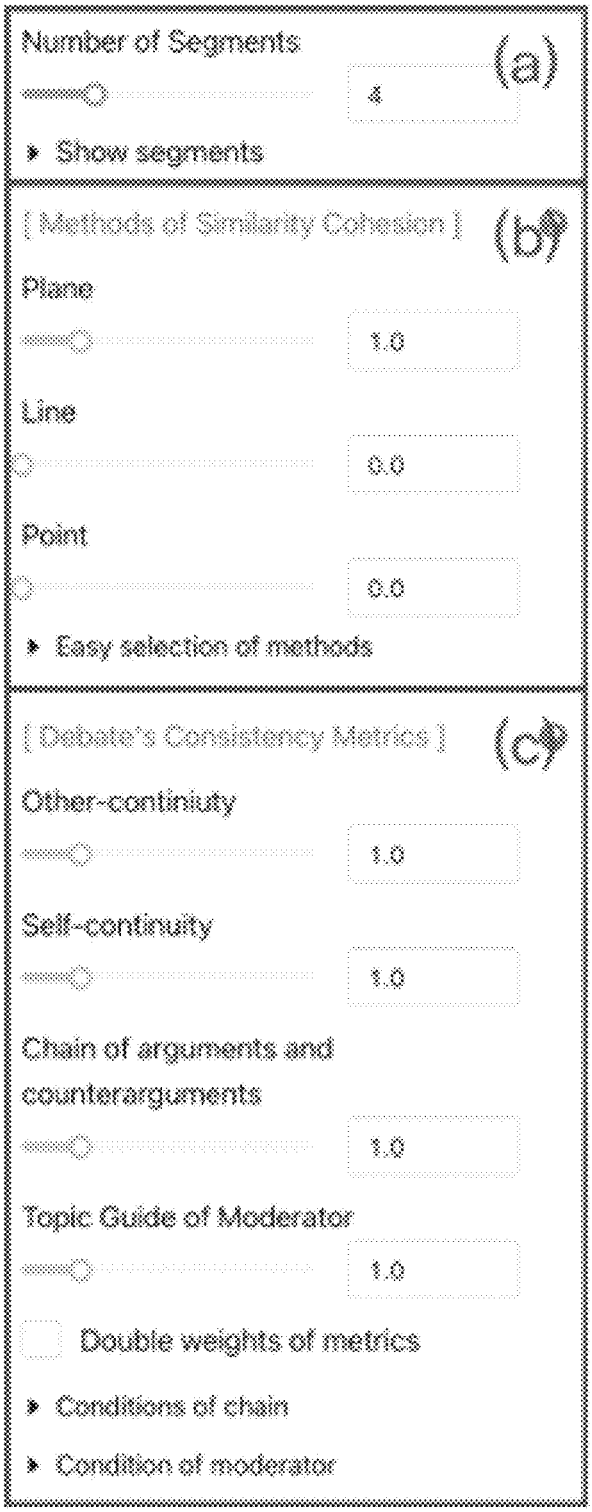
FIG. 17 illustrates a control panel which provides an operator with a pathway to adjust a weighting to influence topic segmentation.
Figure 18:
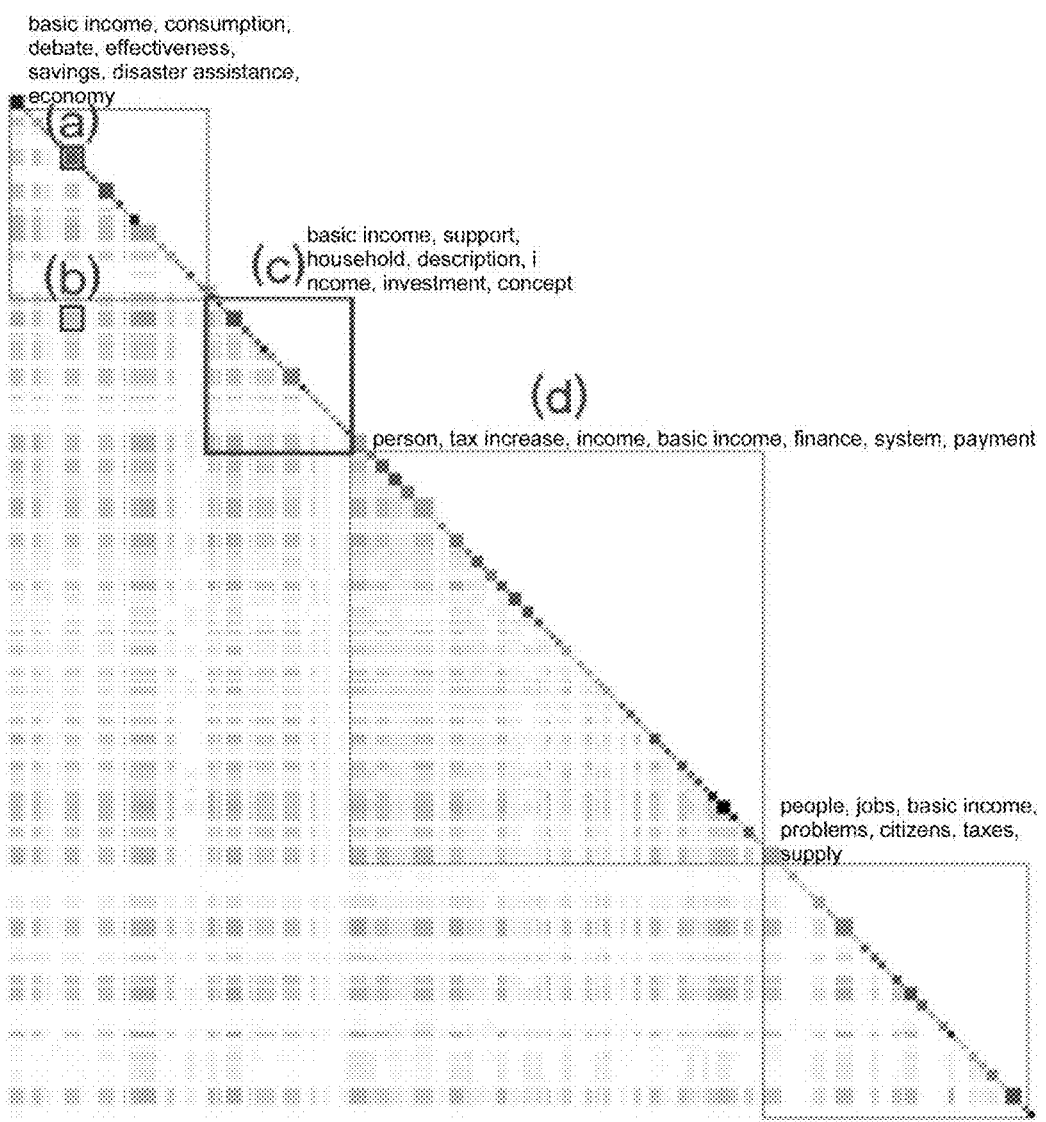
FIG. 18 illustrates an example of a visualization of a result of applying the method of segmenting debate topics according to an embodiment of this specification.

FIG. 16 illustrates a user interface to which the method of segmenting debate topics according to this specification is applied. FIG. 17 illustrates a control panel which provides an operator with a pathway to adjust a weighting to influence topic segmentation. FIG. 18 illustrates an example of a visualization of a result of applying the method of segmenting debate topics according to an embodiment of this specification.

In FIG. 16, (a) is a control panel that allows an operator to intervene in topic segmentation, (b) visualizes conceptual recurrence and expresses all utterances, conceptual similarities, and topic segmented bodies in one frame, and (c) is a script viewer that shows the content of the debate participants' utterances.

The control panel that provides a path for an operator to intervene in topic segmentation may be implemented as illustrated in FIG. 17.

In FIG. 17, (a) is for adjusting the number of topic segmented bodies, (b) is for selecting a method for obtaining the sum of conceptual similarities when calculating similarity cohesion or adjusting a weighting for the method, wherein Plane adjusts planeWeight, Line adjusts lineWeight, and Point adjusts pointWeight. In addition, (c) is for adjusting a weighting of consistency metrics of a debate when calculating the similarity cohesion, wherein Other-continuity adjusts otherWeight, which is a weighting of the other-continuity, Self-continuity adjusts selfWeight, which is a weighting of the self-continuity, Chain of arguments and counterarguments adjusts chainWeight, which is a weighting of the chain of arguments and counterarguments, and Topic guide of moderator adjusts moderatorWeight, which is a weighting of the topic guide of the moderator.

FIG. 18 is a visualization of a result of segmenting topics of a debate using the conceptual recurrence method, wherein (a) shows each utterance of a debate participant, and (b) shows the conceptual similarity indicating the similarity between utterances. The darker the color, the higher the conceptual similarity value. (c) shows the topic segmented bodies that automatically segment topics according to the method of segmenting debate topics, and (d) shows the words derived from the most frequently mentioned utterances in the topic segmented body section, wherein these words may be named the labels of the topic segmented bodies.

As such, as a method of calculating the similarity cohesion based on the conceptual similarity of conceptual recurrence, by combining a plane method, a line method, a point method, and a mixing method thereof, and a method of using quantitative metrics for the other-continuity, the self-continuity, the chain of arguments and counterarguments, and the topic guide of the moderator, which are attributes indicating the internal consistency of a debate, the topic segmentation model was prepared and applied to a debate program.

For the three 100-minute debates, a Korean TV debate program, the results obtained by applying a weighting in a method of mixing similarity cohesion calculation methods (Plane+Line+Point) and a way of improving the internal consistency of consistency metrics of a debate were compared with the results of manually segmenting topics by recruited subjects, and good results were obtained as a result of the comparison.

As such, an embodiment according to this specification may automatically segment topics from a debate using the conceptual similarity of conceptual recurrence and consistency metrics of the debate. In addition, a user-centered topic segmentation result may be obtained by allowing a user to adjust a similarity cohesion calculation method that coheres the conceptual similarity and a weighting of the consistency metrics of the debate. In addition, it is possible to alleviate the issue of determining the topic segmentation point differently for each person in a debate and multilateral discourse.

This specification proposes a semi-automated topic segmentation model in which a user and machine may interact. This allows a computer to automatically calculate the similarity cohesion, and with the help of the machine, the user may adjust the attributes that affect the internal consistency of each debate to obtain the benefit of analyzing the corresponding topic segmentation results.

Various embodiments of the method and device for segmenting topics of content of this specification are simply and clearly described as follows.

A method of segmenting topics of content according to an embodiment includes: preprocessing text data configuring content; and dividing a plurality of utterances into two topic segmented bodies based on the preprocessed data, wherein the preprocessing includes: processing the text data in a continuous form of the plurality of utterances; and calculating a conceptual similarity between utterances based on the processed data, and wherein the dividing includes: calculating similarity cohesion for the two topic segmented bodies based on the conceptual similarity and a consistency metric while changing a segmentation point which distinguishes the two topic segmented bodies; and determining the segmentation point based on the similarity cohesion.

In an embodiment, the method of segmenting topics of content may further include visualizing the plurality of utterances, the conceptual similarity between the utterances, and a plurality of topic segmented bodies formed by segmenting the plurality of utterances.

In an embodiment, the visualization may display one or more words most frequently mentioned in a relevant topic segmented body section in each of the plurality of topic segmented bodies.

In an embodiment, the method for segmenting topics of content may further include displaying a control panel for adjusting a number of topic segmented bodies to be formed by segmenting the plurality of utterances, a weighting for a method of calculating the similarity cohesion, and a weighting for two or more consistency metrics.

In an embodiment, the calculation of the similarity cohesion may include: obtaining a sum of conceptual similarities and a consistency metric for each of the two topic segmented bodies based on the conceptual similarity; calculating the similarity cohesion for a set of topic segmented bodies including the two topic segmented bodies based on the sum of conceptual similarities and the consistency metric; and selecting a segmentation point corresponding to the set of topic segmented bodies having the highest similarity cohesion.

In an embodiment, the similarity cohesion may be a value obtained by dividing a value obtained by multiplying the sum of conceptual similarities by the consistency metric by a number of the conceptual similarities.

In an embodiment, the similarity cohesion for the set of topic segmented bodies may be obtained by obtaining a fifth value obtained by dividing a third value obtained by adding a first value obtained for a first topic segmented body configuring the set of topic segmented bodies and a second value obtained for a second topic segmented body configuring the set of topic segmented bodies by a fourth value obtained by adding a number of conceptual similarities included in the first topic segmented body and a number of conceptual similarities included in the second topic segmented body, and by multiplying the fifth value by a sixth value, which is a number of conceptual similarities included in the set of topic segmented bodies.

In an embodiment, the sum of conceptual similarities may be obtained by using at least one of a plane method of adding all conceptual similarities included in the topic segmented body, a line method of adding conceptual similarities belonging to an edge of an L shape of the topic segmented body, and a point method of selecting the conceptual similarity between a start utterance and an end utterance of the topic segmented body.

In an embodiment, the consistency metric may be a value obtained by quantifying one or more of other-continuity, self-continuity, a chain of arguments and counterarguments, and a topic guide of a moderator which are attributes indicating internal consistency of the plurality of utterances.

In an embodiment, a number of the conceptual similarities may be obtained by multiplying a number of conceptual similarities used when obtaining the sum of conceptual similarities by the plane method, the line method, and the point method by a weighting applied to the plane method, the line method, and the point method, respectively.

In an embodiment, the processing may include: performing morphological analysis and sentiment analysis on a plurality of utterances; and expressing each utterance as a vector composed of key words, wherein the conceptual similarity between two utterances may be calculated as an inner product between vectors indicating the utterances.

A device of segmenting topics of content according to another embodiment includes: an input unit for receiving text data configuring content; a processor for preprocessing the text data and dividing a plurality of utterances into two topic segmented bodies based on the preprocessed data; and a visualization unit for visualizing and expressing the divided topic segmented bodies, wherein the processor is configured to: process the text data in a continuous form of the plurality of utterances and calculate a conceptual similarity between the utterances based on the processed data; and calculate similarity cohesion for the two topic segmented bodies based on the conceptual similarity and a consistency metric while changing a segmentation point which distinguishes the two topic segmented bodies, and determine the segmentation point based on the similarity cohesion.

From the foregoing, it will be apparent to those skilled in the art that various modifications and variations are possible without departing from the technical spirit of the present disclosure. Accordingly, the technical scope of the present disclosure should not be limited to the contents described in the detailed description of the specification, but should be defined by the claims.

What is claimed is:
1. A method of segmenting topics of content, the method including:
preprocessing text data, which is contained in content; and
dividing a plurality of utterances into two topic segmented bodies based on the preprocessed data,
wherein the preprocessing includes:
processing the text data in a continuous form of the plurality of utterances; and
calculating conceptual similarities between the plurality of utterances based on the processed data, and
wherein the dividing includes:
calculating similarity cohesion for the two topic segmented bodies based on the conceptual similarities and consistency metrics while changing a segmentation point which distinguishes the two topic segmented bodies; and
determining the segmentation point based on the similarity cohesion.

2. The method of claim 1, further including:
visualizing the plurality of utterances, the conceptual similarities between the plurality of utterances, and a plurality of topic segmented bodies formed by segmenting the plurality of utterances.

3. The method of claim 2, wherein the visualization displays one or more words most frequently mentioned in a relevant topic segmented body section in each of the plurality of topic segmented bodies.

4. The method of claim 1, further including:
displaying a control panel for adjusting a number of topic segmented bodies to be formed by segmenting the plurality of utterances, a weighting for a method of calculating the similarity cohesion, and a weighting for two or more consistency metrics.

5. The method of claim 1, wherein the calculation of the similarity cohesion includes:
obtaining i) a sum of the conceptual similarities and ii) the consistency metrics, respectively, using the two topic segmented bodies based on the conceptual similarities;
calculating the similarity cohesion for a set of topic segmented bodies including the two topic segmented bodies based on i) the sum of the conceptual similarities and ii) the consistency metrics; and
selecting a segmentation point corresponding to the set of topic segmented bodies having a highest similarity cohesion.

6. The method of claim 5, wherein the similarity cohesion is a value obtained by dividing a value obtained by multiplying the sum of the conceptual similarities by the consistency metrics by a number of the conceptual similarities.

7. The method of claim 6, wherein the similarity cohesion for the set of topic segmented bodies is obtained by obtaining a fifth value obtained by dividing a third value obtained by adding a first value obtained for a first topic segmented body contained in the set of topic segmented bodies and a second value obtained for a second topic segmented body contained in the set of topic segmented bodies by a fourth value obtained by adding a number of conceptual similarities included in the first topic segmented body and a number of conceptual similarities included in the second topic segmented body, and by multiplying the fifth value by a sixth value, which is a number of conceptual similarities included in the set of topic segmented bodies.

8. The method of claim 5, wherein the sum of the conceptual similarities is obtained by using at least one of a plane method of adding all conceptual similarities included in the set of topic segmented bodies, a line method of adding conceptual similarities belonging to an edge of an L shape of the set of topic segmented bodies, and a point method of selecting a conceptual similarity between a start utterance and an end utterance of the set of topic segmented bodies.

9. The method of claim 8, wherein a number of the conceptual similarities is obtained by multiplying a number of conceptual similarities used when obtaining the sum of the conceptual similarities by the plane method, the line method, and the point method by a weighting applied to the plane method, the line method, and the point method.

10. The method of claim 1, wherein the consistency metrics are values obtained by quantifying one or more of i) other-continuity, ii) self-continuity, iii) a chain of arguments and counterarguments, and iv) a topic guide of a moderator, which are attributes indicating internal consistency of the plurality of utterances.

11. The method of claim 1, wherein the processing includes:
   performing morphological analysis and sentiment analysis on the plurality of utterances; and
   expressing each of the plurality of utterances as a vector composed of key words,
   wherein a conceptual similarity between a first utterance and a second utterance of the plurality of utterances is calculated as an inner product between a first vectors indicating the first utterances and a second vector indicating the second utterance.

12. A device of segmenting topics of content, the device including:
   an input unit for receiving text data, which is contained in content;
   a processor for preprocessing the text data and dividing a plurality of utterances into two topic segmented bodies based on the preprocessed data; and
   a visualization unit for visualizing and expressing the two topic segmented bodies,
   wherein the processor is configured to:
   process the text data in a continuous form of the plurality of utterances and calculate a conceptual similarities between the plurality of utterances based on the processed data; and
   calculate similarity cohesion for the two topic segmented bodies based on the conceptual similarities and a consistency metrics while changing a segmentation point which distinguishes the two topic segmented bodies, and determine the segmentation point based on the similarity cohesion.

13. The device of claim 12, wherein the visualization unit visualizes the plurality of utterances, the conceptual similarities between the plurality of utterances, and a plurality of topic segmented bodies formed by segmenting the plurality of utterances, and displays one or more words most frequently mentioned in a relevant topic segmented body section in each of the plurality of topic segmented bodies.

14. The device of claim 12, wherein the visualization unit displays a control panel for adjusting a number of topic segmented bodies to be formed by segmenting the plurality of utterances, a weighting for a method of calculating the similarity cohesion, and a weighting for two or more consistency metrics.

15. The device of claim 12, wherein the processor obtains i) a sum of the conceptual similarities and ii) the consistency metrics, respectively using the two topic segmented bodies based on the conceptual similarities, calculates the similarity cohesion for a set of topic segmented bodies including the two topic segmented bodies based on i) the sum of the conceptual similarities and ii) the consistency metrics, and selects a segmentation point corresponding to the set of topic segmented bodies having a highest similarity cohesion.

16. The device of claim 15, wherein:
   the processor obtains the similarity cohesion by dividing a value obtained by multiplying the sum of the conceptual similarities by the consistency metrics by a number of the conceptual similarities; and
   the processor obtains the similarity cohesion for the set of topic segmented bodies by obtaining a fifth value obtained by dividing a third value obtained by adding a first value obtained for a first topic segmented body contained in the set of topic segmented bodies and a second value obtained for a second topic segmented body contained in the set of topic segmented bodies by a fourth value obtained by adding a number of conceptual similarities included in the first topic segmented body and a number of conceptual similarities included in the second topic segmented body, and by multiplying the fifth value by a sixth value, which is a number of conceptual similarities included in the set of topic segmented bodies.

17. The device of claim 15, wherein the processor obtains the sum of the conceptual similarities by using at least one of a plane method of adding all conceptual similarities included in the set of topic segmented bodies, a line method of adding conceptual similarities belonging to an edge of an L shape of the set of topic segmented bodies, and a point method of selecting a conceptual similarity between a start utterance and an end utterance of the set of topic segmented bodies.

18. The device of claim 17, wherein the processor obtains a number of the conceptual similarities by multiplying a number of conceptual similarities used when obtaining the sum of the conceptual similarities by the plane method, the line method, and the point method by a weighting applied to the plane method, the line method, and the point method.

19. The device of claim 12, wherein the consistency metrics are values obtained by quantifying one or more of i) other-continuity, ii) self-continuity, iii) a chain of arguments and counterarguments, and iv) a topic guide of a moderator, which are attributes indicating internal consistency of the plurality of utterances.

20. The device of claim 12, wherein the processing includes:
   performing morphological analysis and sentiment analysis on the plurality of utterances; and
   expressing each of the plurality of utterances as a vector composed of key words,
   wherein a conceptual similarity between a first utterance and a second utterance of the plurality of utterances is calculated as an inner product between a vector indicating the first utterance and a second vector indicating the second utterance.

* * * * *